(12) United States Patent
von und zu Liechtenstein

(10) Patent No.: US 10,218,968 B2
(45) Date of Patent: Feb. 26, 2019

(54) GAZE-CONTINGENT DISPLAY TECHNIQUE

(71) Applicant: Maximilian Ralph Peter von und zu Liechtenstein, Rorschach (CH)

(72) Inventor: Maximilian Ralph Peter von und zu Liechtenstein, Rorschach (CH)

( * ) Notice: Subject to any disclaimer, the term of this patent is extended or adjusted under 35 U.S.C. 154(b) by 124 days.

(21) Appl. No.: 15/062,095

(22) Filed: Mar. 5, 2016

(65) Prior Publication Data

US 2016/0191910 A1  Jun. 30, 2016

(51) Int. Cl.
G06F 3/01 (2006.01)
H04N 13/139 (2018.01)
H04N 13/279 (2018.01)
H04N 13/383 (2018.01)

(52) U.S. Cl.
CPC ........... *H04N 13/383* (2018.05); *G06F 3/013* (2013.01); *H04N 13/279* (2018.05); *H04N 13/139* (2018.05)

(58) Field of Classification Search
CPC  G06F 3/013; H04N 5/23212; H04N 13/0484; H04N 13/0271
See application file for complete search history.

(56) References Cited

U.S. PATENT DOCUMENTS

| | | | |
|---|---|---|---|
| 6,426,755 B1 | 7/2002 | Deering | |
| 9,137,524 B2 | 9/2015 | Maciocci | |
| 9,491,431 B2 * | 11/2016 | Zhou | H04N 13/042 |
| 9,497,380 B1 * | 11/2016 | Jannard | H04N 5/247 |
| 9,607,424 B2 * | 3/2017 | Ng | G06T 15/005 |
| 9,699,433 B2 * | 7/2017 | Zhou | H04N 13/0242 |

(Continued)

OTHER PUBLICATIONS

Keith Rayner, Eye Movements in Reeding and Information Processing: 20 Years of Research, Psychological Bulletin, 1998, vol. 124, No. 3, 372-422, American Psychological Association Inc., U.S.A.

*Primary Examiner* — John Villecco

(57) ABSTRACT

A gaze contingent display technique for providing a human viewer with an enhanced three-dimensional experience not requiring stereoscopic viewing aids. Methods are shown which allow users to view plenoptic still images or plenoptic videos incorporating gaze-contingent refocusing operations in order to enhance spatial perception. Methods are also shown which allow the use of embedded markers in a plenoptic video feed signifying a change of scene incorporating initial depth plane settings for each such scene. Methods are also introduced which allow a novel mode of transitioning between different depth planes wherein the user's experience is optimized in such a way that these transitions trick the human eye into perceiving enhanced depth. This disclosure also introduces a system of a display device which comprises gaze-contingent refocusing capability in such a way that depth perception by the user is significantly enhanced compared to prior art. This disclosure comprises a nontransitory computer-readable medium on which are stored program instructions that, when executed by a processor, cause the processor to perform operations relating to timing the duration the user's gaze is fixated on each of a plurality of depth planes and making a refocusing operation contingent of a number of parameters.

16 Claims, 10 Drawing Sheets t1, t3 >= T    T: Gaze Fixation Threshold
t2 < T

(56) References Cited

U.S. PATENT DOCUMENTS

| | | | |
|---|---|---|---|
| 9,800,856 B2 * | 10/2017 | Venkataraman | H04N 13/0007 |
| 2004/0207635 A1 | 10/2004 | Miller et al. | |
| 2008/0131019 A1 * | 6/2008 | Ng | G06T 5/50 |
| | | | 382/255 |
| 2010/0128145 A1 * | 5/2010 | Pitts | H04N 5/23212 |
| | | | 348/231.99 |
| 2011/0273369 A1 * | 11/2011 | Imai | G06T 15/20 |
| | | | 345/158 |
| 2011/0273466 A1 * | 11/2011 | Imai | G09G 3/20 |
| | | | 345/589 |
| 2012/0019703 A1 | 1/2012 | Thôrn | |
| 2012/0147328 A1 | 6/2012 | Yahav | |
| 2012/0249550 A1 * | 10/2012 | Akeley | H04N 5/232 |
| | | | 345/419 |
| 2013/0169754 A1 * | 7/2013 | Aronsson | H04N 5/23212 |
| | | | 348/46 |
| 2013/0271454 A1 * | 10/2013 | Lyons | G06T 11/60 |
| | | | 345/419 |
| 2013/0335404 A1 | 12/2013 | Westerinen et al. | |
| 2014/0049462 A1 * | 2/2014 | Weinberger | G06F 3/013 |
| | | | 345/156 |
| 2014/0146148 A1 * | 5/2014 | Maciocci | H04N 13/0484 |
| | | | 348/59 |
| 2014/0176813 A1 * | 6/2014 | Conness | H04N 5/60 |
| | | | 348/738 |
| 2014/0198098 A1 * | 7/2014 | Joo | H04N 13/0018 |
| | | | 345/419 |
| 2014/0219576 A1 * | 8/2014 | Yokoyama | G06T 5/003 |
| | | | 382/255 |
| 2014/0240578 A1 * | 8/2014 | Fishman | H04N 5/23212 |
| | | | 348/333.08 |
| 2016/0173883 A1 * | 6/2016 | Lawrence | H04N 19/14 |
| | | | 348/46 |
| 2016/0182830 A1 * | 6/2016 | Hu | G06T 5/003 |
| | | | 348/231.6 |
| 2016/0275987 A1 * | 9/2016 | Le Clerc | G11B 27/031 |
| 2016/0307372 A1 * | 10/2016 | Pitts | H04N 13/0282 |
| 2016/0353026 A1 * | 12/2016 | Blonde | G06T 7/0002 |
| 2017/0061635 A1 * | 3/2017 | Oberheu | G06T 7/586 |
| 2017/0091906 A1 * | 3/2017 | Liang | G06T 5/002 |
| 2017/0134639 A1 * | 5/2017 | Pitts | H04N 5/23212 |
| 2017/0178363 A1 * | 6/2017 | Venkataraman | G06T 9/20 |
| 2017/0195661 A1 * | 7/2017 | Du | H04N 13/0406 |
| 2017/0206691 A1 * | 7/2017 | Harrises | G06T 11/60 |
| 2017/0212583 A1 * | 7/2017 | Krasadakis | G06F 3/013 |
| 2017/0237974 A1 * | 8/2017 | Samec | H04N 13/0429 |
| | | | 348/53 |
| 2017/0302903 A1 * | 10/2017 | Ng | H04N 13/0022 |
| 2018/0160048 A1 * | 6/2018 | Rainisto | H04N 13/271 |

* cited by examiner

GAZE-CONTINGENT DISPLAY TECHNIQUE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to systems and methods for displaying plenoptic still and video images, and more particularly to methods, systems and operations for displaying plenoptic content utilizing gaze contingent viewing techniques.

Prior Art

Any discussion of the related art throughout the specification should in no way be considered as an admission that such related art is widely known or forms part of common general knowledge in the field.

With the advent of plenoptic imaging technology a considerable number of contributions to improved display devices have been made in recent years. In particular there have been vast advances in the field which combines eye-tracking sensors with the display of plenoptic images. Plenoptic technology allows images to be captured as a light field which is later computationally processed. The processing of light field data allows, amongst other benefits of the technology, to refocus an image after it has been captured. Recent patent applications have demonstrated a combination of plenoptic displays with eye-tracking technology in such as a way that a user can direct their gaze at a plenoptic image and the display automatically refocuses the image based on the user's gaze. Independently of plenoptic image technology there is the known technique of foveated imaging, whereby the amount of detail in an image varies according to a fixation point determined by applying the gaze-contingency paradigm. The gaze-contingency paradigm is a general term for techniques allowing a computer screen display to change in function depending on where the viewer is looking.

SUMMARY

The known techniques for refocusing a plenoptic image based on gaze-contingent viewing have been recognized by the present inventor to be beset with a number of problems. The present invention is related, in part, to the discovery of these problems and the provision of appropriate solutions.

The primary purpose of refocusing a plenoptic image on a still or video display of plenoptic content ought to be an enhanced perception of the scene being subject of the image. Refocusing such an image therefore ought to enhance subjective spatial perception by the human viewer, in particular an enhancement of perception of depth. Refocusing a plenoptic image in an appropriate way may yield a novel three-dimensional viewing experience entirely independent of existing stereoscopic technology. For this three-dimensional viewing experience to be possible a number of obstacles have to be overcome first however.

One of the problems identified in the context of this invention is that refocusing as achieved by prior art techniques is often too frequent and thus leads to an unsatisfactory user experience. A constantly shifting focus in instant response to even the slightest eye movement tends to be seen as very annoying by the average user and the user acceptance of such systems is accordingly rather low. The human gaze consists of different types of gazes, comprising fast fleeting movements of the eyes, such as glances as well as slower and more targeted movements, such a gaze fixation. A gaze fixation may therefore incorporate a lengthy fixation on a particular image area or image subject. It can be shown that the refocusing of a plenoptic image yields maximum depth-perception enhancement if a suitable threshold is introduced, wherein the threshold serves as a pre-condition for refocusing a plenoptic image. The image thus is only refocused if the user's gaze has been concentrated on a particular focal plane for such time span as mandated by that threshold. By introducing this threshold the invention also allows the user to view the image bokeh, which would otherwise not be possible. The present invention recognizes that bokeh is an important factor in rendering a non-steroscopic three-dimensional viewing experience. Rather than trying to eliminate bokeh altogether by either making the entire image to appear in focus or by instant gaze-contingent refocusing, the present invention aims to even exaggerate bokeh to such an extent that an optimal three-dimensional illusion is achieved. It has been recognized by this invention that in order to achieve an optimal three-dimensional effect the refocusing operation ought to comprise a degree of bokeh enhancement, it also ought to comprise utilization of a gaze fixation threshold, as well as a seamless focus transition operation which eliminates any sudden and abrupt changes on the image in response to fleeting eye movements. The optimal three-dimensional viewing experience of plenoptic media content may thus not be achieved if the image is instantaneously refocused at whichever point the human viewer happens to project their glance, as is the current state of the art.

A particular problem materializes when during a display of a plenoptic video there is an abrupt change of scene. The interactive adjusting of focal depth which is subject to this invention requires special treatment whenever there is such a change of scene. Firstly, such change of scene has to be detected by the system and secondly, an appropriate initial focal depth has to be set. The present invention, in part, provides a solution to this problem by introducing change of scene markers into the video source which encompass a recommended initial focal depth setting for each scene.

A preferred embodiment of the present invention involves a virtual reality system wherein the user is placed in the center of a virtual sphere and wherein the plenoptic image comprises a projection onto that sphere in such a way that the user is fully immersed in the image. This type of embodiment of the present invention is particularly suited for combining the described image refocusing technique with the technique of foveated imaging. Therefore only a part of the overall image is selectively refocused. Other than improving rendering speed, combining foveated imaging with the described refocusing technique has been found to have other advantages over prior art. Combining foveated imaging with the described refocusing technique enhances the overall three-dimensional viewing experience by the consumer in such a way that the subjective spatial perception by a human viewer appears to be at an optimum.

This disclosure provides, in part, a method.

The method includes detecting the gaze of a person looking at a display of a plenoptic image. The method comprises refocusing the image when certain requirements are fulfilled.

This disclosure also provides, in part, a system of a display device for plenoptic images. The system includes eye tracking capabilities which allow the system to generate a lifelike three-dimensional viewing experience in which stereoscopic viewing aids are not necessarily required.

This disclosure also provides, in part, a nontransitory computer-readable medium on which are stored program instructions that, when executed by a processor, cause the processor to perform operations related to processing a plenoptic image for an enhanced three-dimensional user experience, comprising in part a timer operation which serves as a crucial aid when a decision has to be made whether, and in which way, to refocus at a different depth plane.

There has thus been outlined, rather broadly, some of the features of the gaze-contingent display technique in order that the detailed description thereof may be better understood, and in order that the present contribution to the art may be better appreciated. There are additional features of the gaze-contingent display technique that will be described hereinafter and that will form the subject matter of the claims appended hereto. In this respect, before explaining at least one embodiment of the gaze-contingent display technique in detail, it is to be understood that the gaze-contingent display technique is not limited in its application to the details of construction or to the arrangements of the components set forth in the following description or illustrated in the drawings. The gaze-contingent display technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
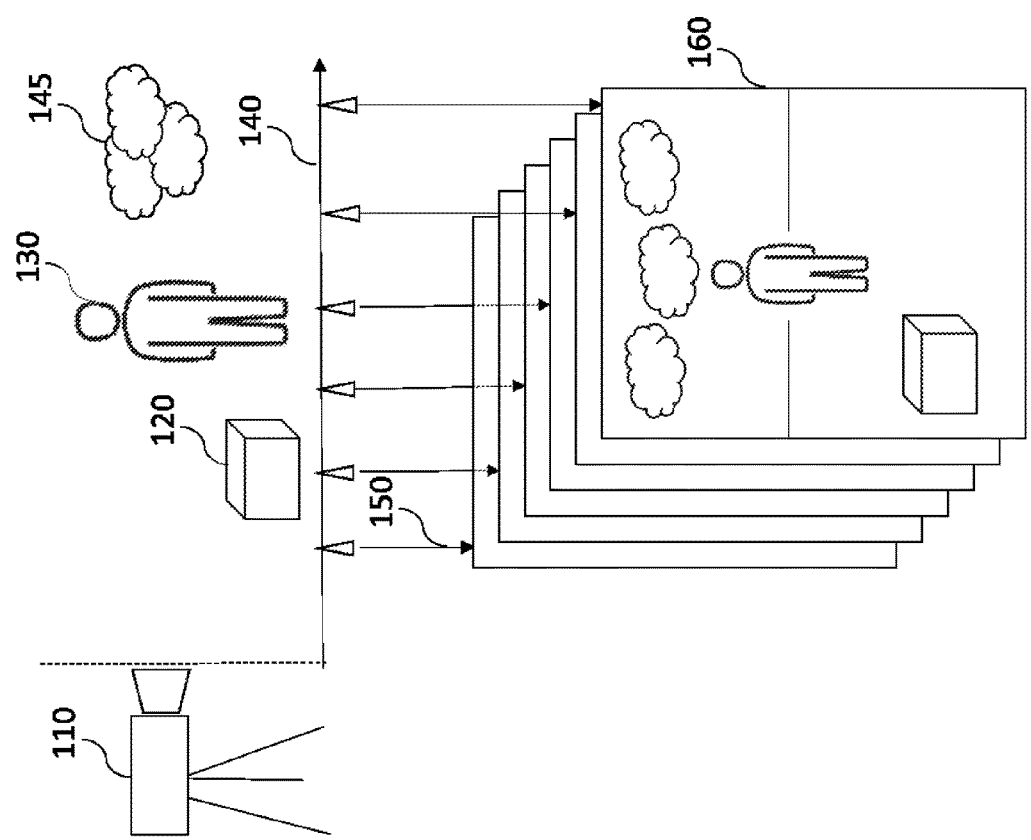
FIG. 1 is a frontal view illustrating the concept of translating image field data into an array of depth planes corresponding to a range of different focal distances.

The prior art knows a technique of viewing light field images in a format named "editable living picture" which comprises a plurality of seven TIF format images in addition to a depth map, wherein a depth map comprises a layer of data that defines the distance of various surfaces from the lens of the camera, like a topographic map of that image. FIG. 1 depicts such a stack of images, each with its own focal length. The camera 110 is shown to capture three different objects 120 130 145, each at a different distance 145 from the camera. A mapping 150 maps each image to a specific focal depths. Axis 140 denotes increasing distance from the lens of the camera, whereas image 160 denotes an exemplary image in the stack of focal-variant images.

Figure 2:
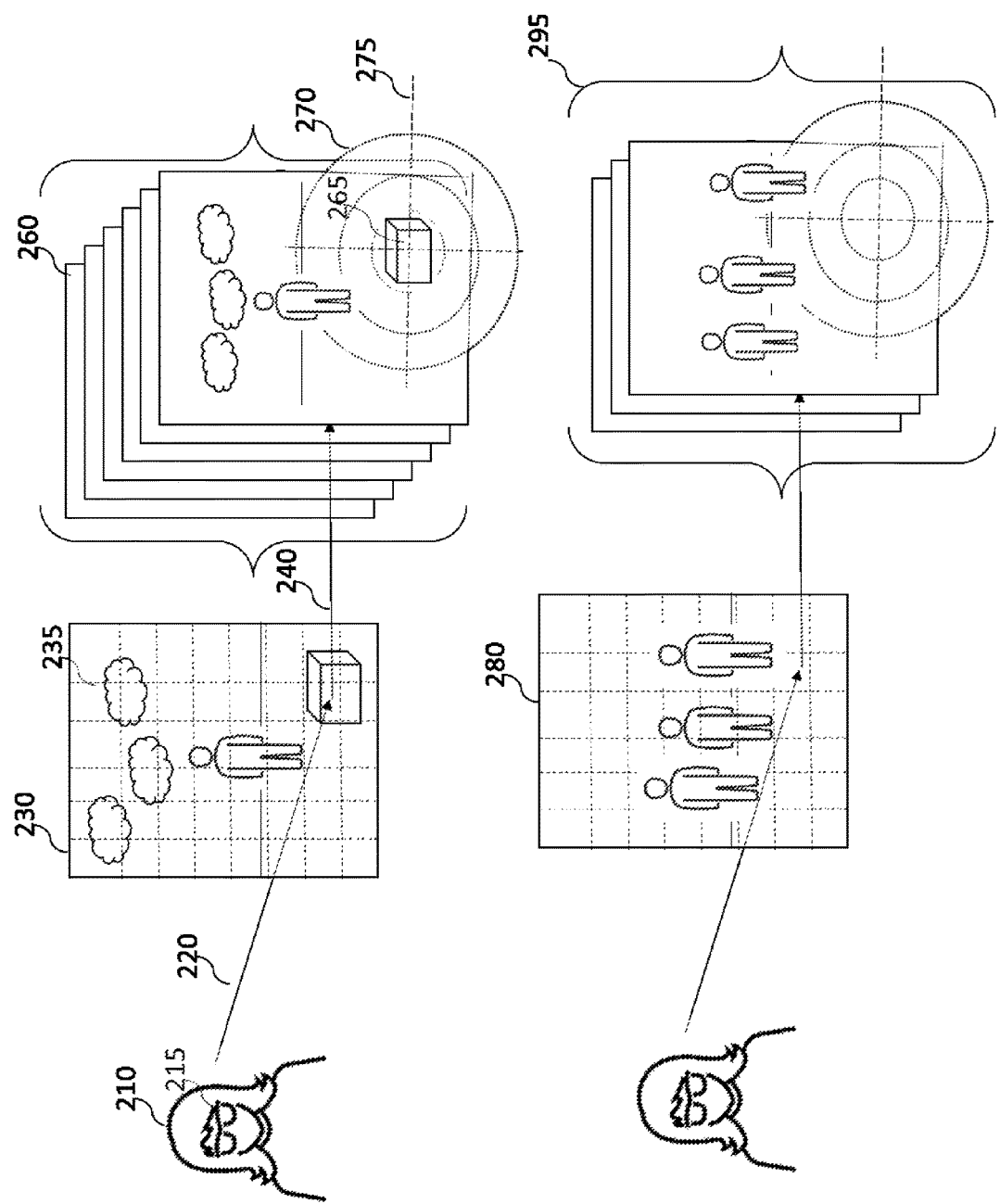
FIG. 2 is a schematic diagram illustrating the concept of applying a depth map to a stack of focal variant images dependent on a viewer's gaze fixation.

FIG. 2 depicts an embodiment of the present invention whereby a user 210 is wearing a head-mountable device 215 capable of tracking the user's gaze fixation 220 on an image 230 which comprises a depth map 235 wherein a grid is utilized to map 240 each grid element to a "living picture"-type image 260 of a specific focal depth. Whenever the user changes her gaze to a different image segment, the depth map is used in order to find out whether the new segment is associated with a different image in the focal variant stack 295. In an embodiment of the present invention foveated imaging is utilized to give the viewer of plenoptic image additional spatial perception. On the figure the point of gaze fixation is marked with crosshairs 275, whereas the foveated imaging is depicted by means of concentric circles 270 around the point of gaze fixation 265. Therefore, when a user views a plenoptic image in the depicted embodiment the image dynamically changes in two aspects in response to a changing gaze fixation. On the one hand, a refocusing of the image is simulated by interchanging different images from the focal variant stack of images and on the other hand, the resolution of whichever stack image is displayed at a time is adjusted so that the highest resolution is used at the point of gaze fixation and so that the resolution drops off as a function of distance from the point of gaze fixation.

The embodiment depicted in FIG. 2 illustrates an inventive departure from the prior art in the form of a variable-size focal variant stack is used as a means to achieve better data compression and thus better viewing performance if the images are to be viewed in the form of a video. This concept is exemplified by the difference of plenoptic image 230 in comparison to plenoptic image 280. Whereas image 230 requires the full range of focal depth due to the fact that there are significant objects both in the foreground, medium range and background of the image, image 280 is much simpler in composition, whereby most significant objects are concentrated in only a few focal planes. It is therefore advantageous to use a format whereby instead of a fixed number of images in the focal variant stack a variable number is used instead. The depicted embodiment uses a data compression algorithm to determine an optimal number of elements in the focal variant stack of images for each plenoptic image in a video-type sequence of plenoptic image frames. The data compression algorithm also takes into account the amount of blur or bokeh in a displayed image. Generally speaking, the greater the amount of bokeh in an image, the greater the number of depth planes which need to be placed in an associated stack of focal variant images. A preferred embodiment of the present invention uses a morphing engine in order to create an improved depth perception for the user by smoothing out the transitions between focal planes. The desired three-dimensional experience is significantly hampered if the transitions between images appear sudden or jerky. The morphing parameters require adjusting in such a way that the user will become consciously unaware that the viewed image is being progressively refocused and post-processed in response to their gaze. Therefore an enhanced spatial perception by the user can only be accomplished in a satisfactory way if any transitions are very smooth and subtle and occur in a carefully coordinated way, which is a central aspect where the prior art benefits from improvement. In accordance with an embodiment of the invention no direct transitions between non-neighboring depth planes are permitted. In order to provide the image consumer with a smooth three-dimensional viewing experience it is essential that the transitions between depth planes are as smooth as possible and therefore a gradual and incremental change between depth planes is to be preferred to an abrupt transition spanning several depth planes.

Figure 3:
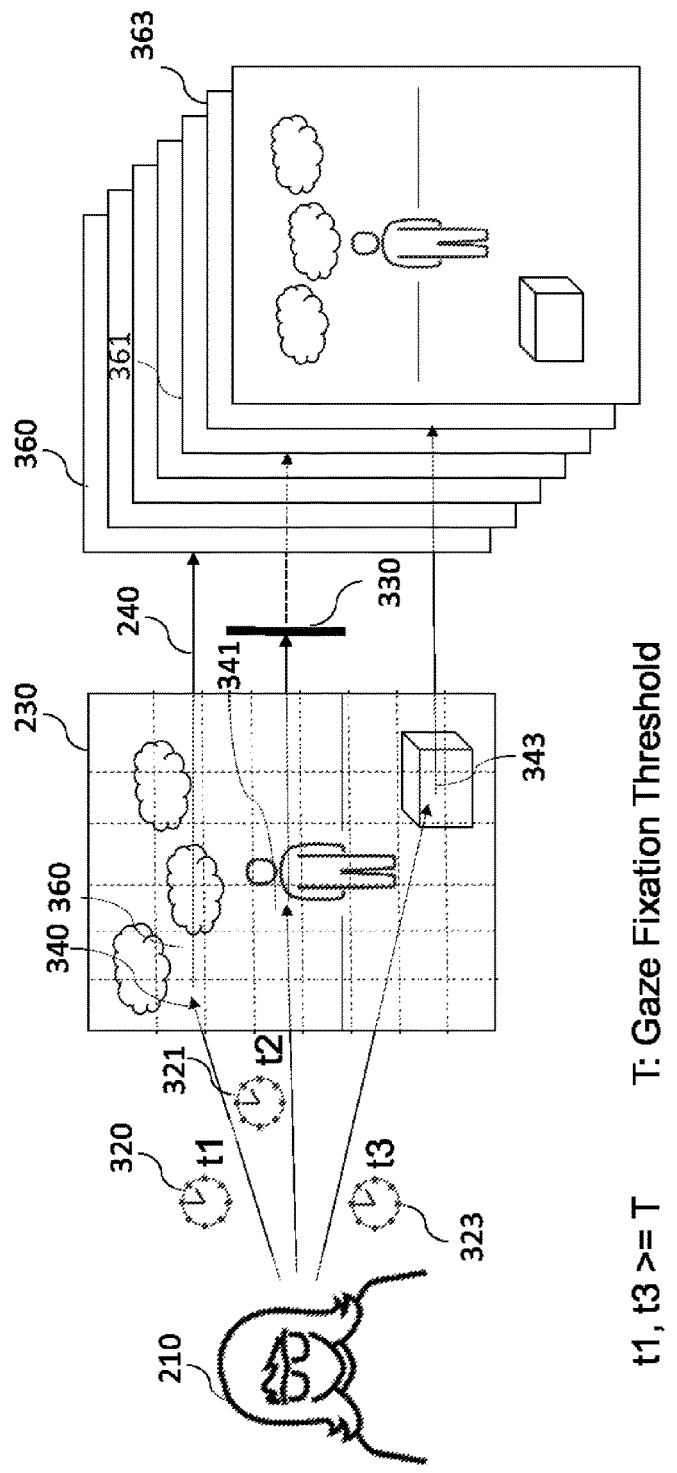
FIG. 3 is a schematic diagram introducing the concept of gaze fixation thresholds wherein a refocusing operation is only permitted after such threshold has been exceeded.

In accordance with an advantageous feature of the invention, and as can be seen from FIG. 3 the amount of time that the gaze fixation of a viewer 210 remains on a particular depth plane during a defined interval is determined. In the example depicted the viewer directs her gaze fixation 320 to image segment 340 for a time t1. Subsequently she directs her gaze fixation 321 to image segment 341 for a time t2. Finally she looks at an depicted object 343 and as a consequence directs her gaze fixation 322 to image segment 342 for a time t3 323. Image segment 340 is mapped to depth plane 360, image segment 341 is mapped to depth plane 361 and image segment 343 is mapped to depth plane 363. The embodiment of the invention defines a gaze fixation threshold T which is the cumulative time a user's gaze fixation has to hover over a depth plane in a defined interval before the viewed image may be refocused on a different depth plane. In the example times t1 and t3 exceed the threshold T, therefore a refocusing operation will take place in response to gaze fixation 320 and 323, but not 321. It has to be noted that if, hypothetically, gaze fixation time t1 was divided between image segments 340 and 360, then a refocusing event would take place also, because image segments 340 and 360 happen to be associated with the same depth plane and it is the cumulative time on a depth plane, as opposed to the image segment which serves as the trigger for a refocusing operation. Delaying the refocus operation in the way described is a significant innovative departure over the prior art, because the delay prevents a physiologically straining three-dimensional experience. An image which features rapid and constant change of focus in response to a wandering gaze has been shown to cause headaches and discomfort of the viewer and causes the overall experience to be generally rated as unsatisfactory. However, the depicted improvement encompassing a delay factor causes the viewing experience to be rated as more pleasant by the average viewer. An additional beneficial effect is that the viewer tends to rate the viewing experience to exhibit improved spatial perception. It has to be noted, however, that the degree of spatial perception is also somewhat dependent on the amount of blur or bokeh featured in the image itself. The improved viewing technique which is utilized by the described embodiment of the invention works best if there is at least a minimum amount of bokeh in the image. An image shot with a very wide angle lens would feature very little blur and would thus not be very suitable for providing the viewer with the desired degree of enhanced spatial perception.

Figure 4:
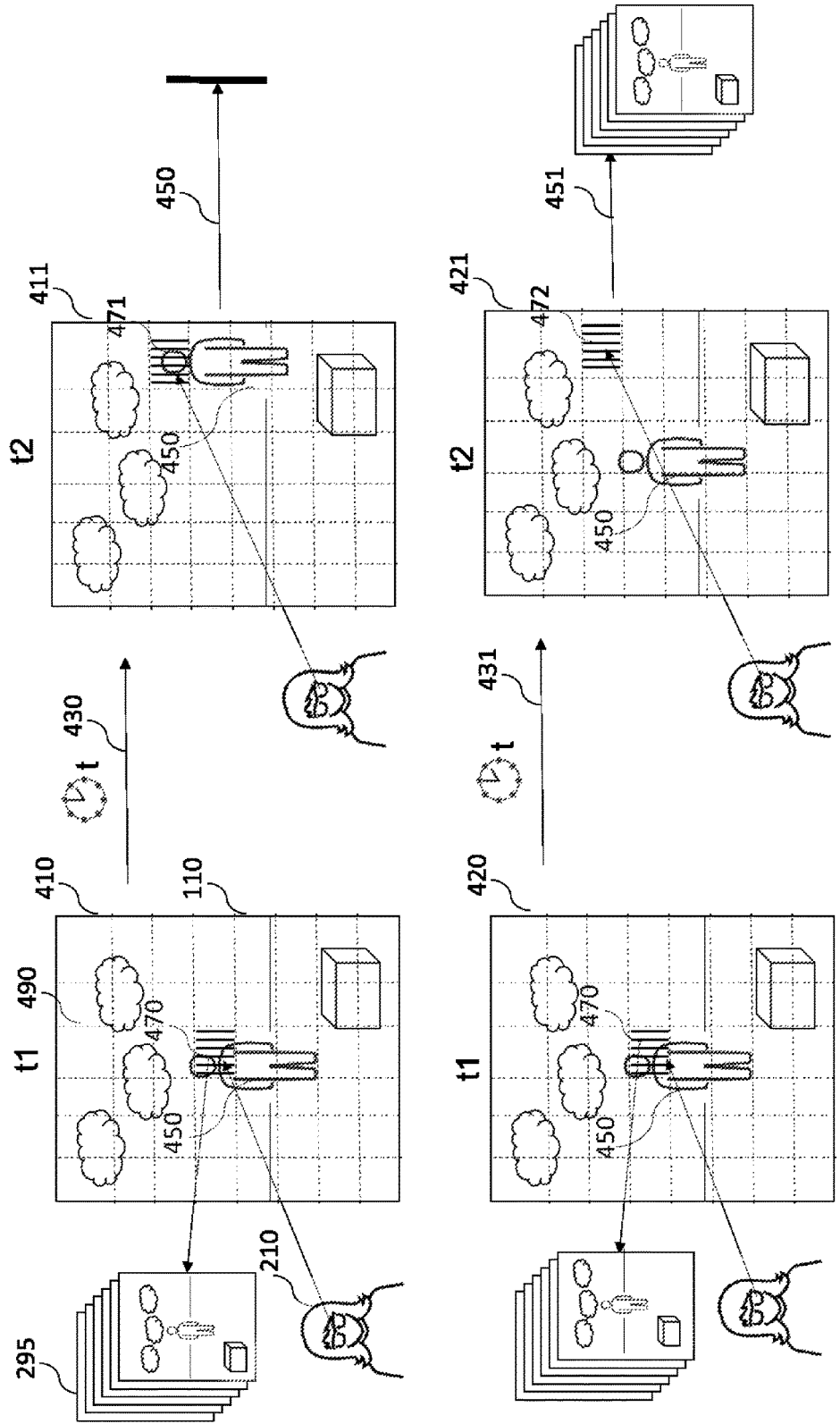
FIG. 4 is a schematic diagram illustrating the concept of gaze-contingent refocusing including mapping image segments to a depth map and accumulating the times a user's gaze rests on each depth plane during a defined interval.

FIG. 4 further illustrates the concept introduced as part of the present invention in that a refocusing operation is undesirable unless the user's gaze fixation on a depth plane exceeds a threshold. The embodiment depicted relates to displaying a video sequence of plenoptic images whereby each image comprises a stack of focal variant images 295. Images 410 and 420 both depict the same scene. In the scenario shown at the top of FIG. 4 the subject 450 of the viewer's gaze moves to the right of the scene in a subsequent video frame 411, whereas in the bottom scenario the subject stays roughly in the same position in the subsequent video frame 421. In a similar way as with still images a depth map grid 490 is associated with each image and also the time is measured relating to the time the viewer's gaze rests on a depth plane. In the first transition 430 no refocusing takes place because both image segments 470 and 471 are associated with the same depth plane. In the second transition 431, however, image segment 472 is associated with a different depth plane and as long as the time threshold requirement is fulfilled, a refocusing operation 451 will take place in the bottom scenario.

Figure 5:
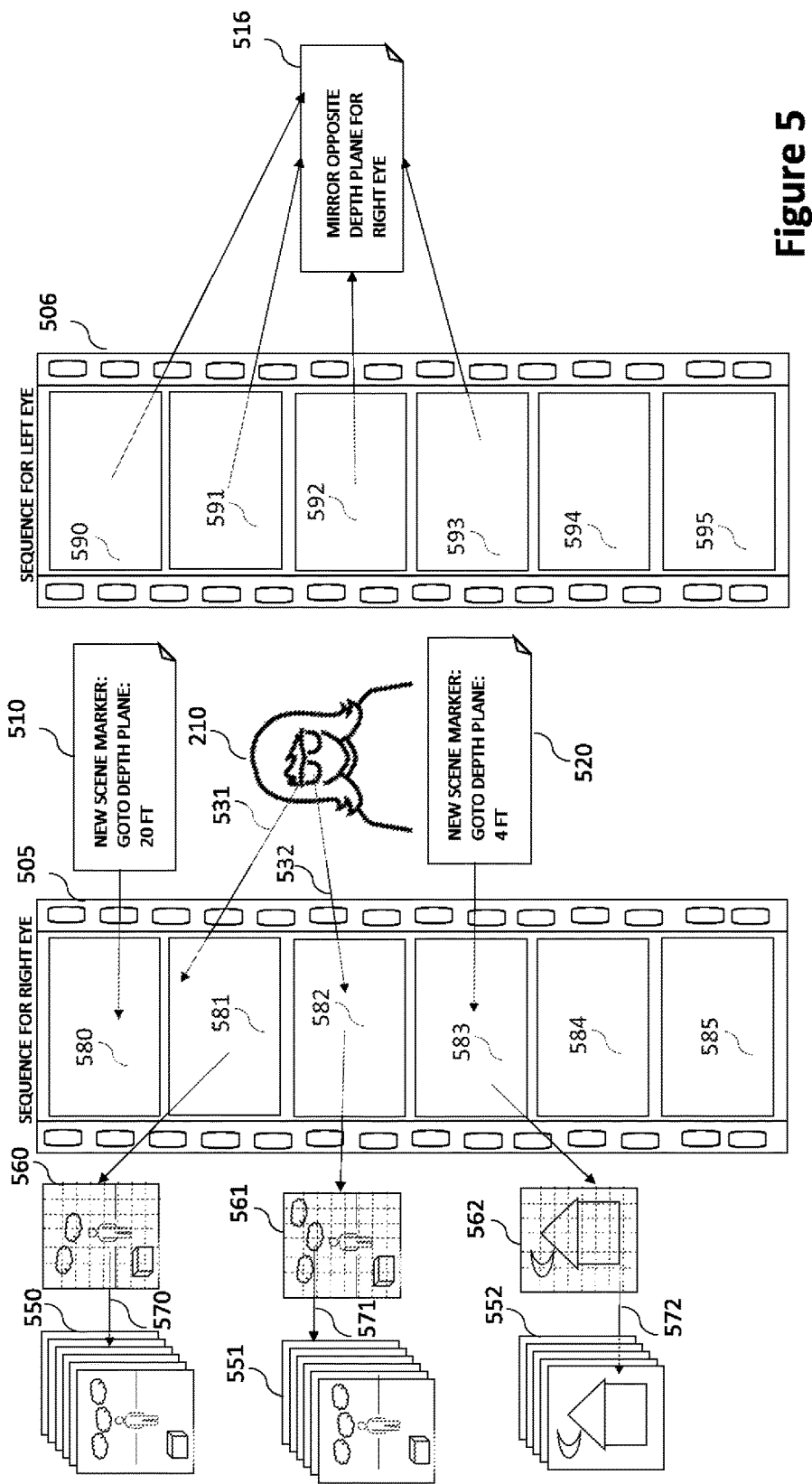
FIG. 5 is a schematic diagram illustrating the concept of displaying a video-type sequence of plenoptic images to a user wearing a virtual reality type head-mountable device comprising stereoscopic display capability.

FIG. 5 depicts an embodiment of the present invention, wherein a plenoptic video sequence is displayed to a user 210 wearing a head-mountable stereoscopic display device. The video sequence consists of consecutive frames 580 581 582 583 584 585 which are shown on the display targeted for the right eye and consecutive frames 590 591 592 593 594 595 which are shown on the display targeted for the left eye. The opposite depth plane may be mirrored for the right eye 516. Each frame has an association 570 571 572 between a focal variant stack of images 550 551 552 and a depth map 560 561 562. A further advantageous feature of the present invention is the introduction of change of scene markers 510 520 comprising an initial value for the depth plane setting. Frame 580 is thus associated with new scene marker 510 which sets the initial depth plane for that scene at 20 ft. Frame 590 which is displayed at the same time on the left-hand display mirrors that depth plane setting. Since there is no indication to use different depth planes targeted at each eye individually, the depth plane setting is always locked synchronously between the screen sequences 505 and 506 for either eye. The subsequent frames 581 and 582 do not have screen markers associated with them and can thus be refocused contingent on shifting gaze fixation 531 and 532. Viewer-initiated refocusing is again automatically disabled on frame 583 since that frame is again associated with change of scene marker, this time setting the initial depth parameter to 4 ft.

Figure 6:
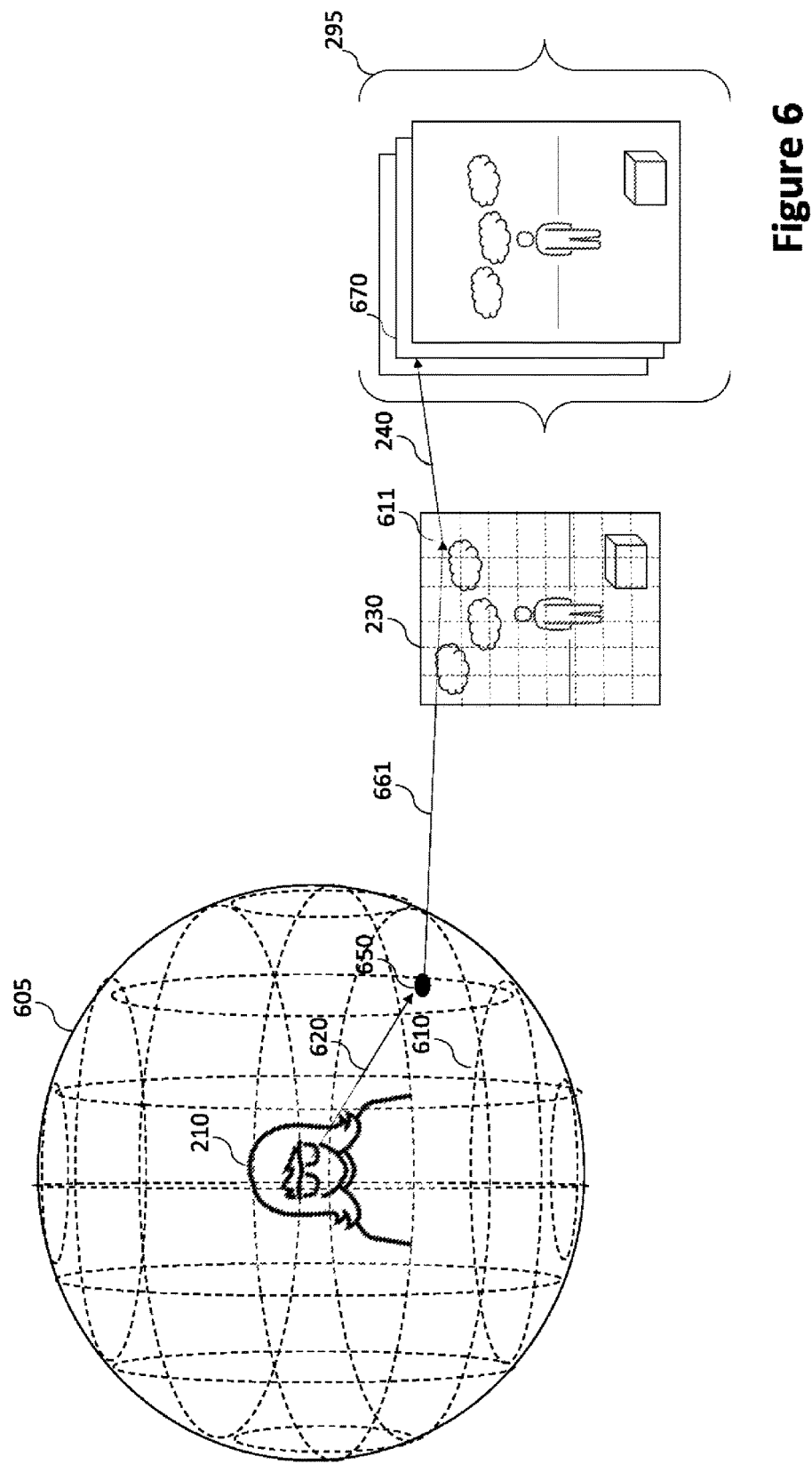
FIG. 6 is a schematic diagram illustrating an embodiment of the invention whereby the image consists of a virtual reality type spherical projection.

FIG. 6 presents an embodiment of the present invention whereby the invention is utilized in a virtual reality setting. The embodiment comprises a spherical projection of an image 605. The viewer 210 directs her gaze 620 to a point 650 of the sphere; the point in turn is part of segment 610.

Sphere segment 610 is mapped 661 via a depth map 230 to corresponding segment 611 on the depth map. Segment 611 corresponds to depth plane 670 in the focal variant stack of images 295.

Figure 7:
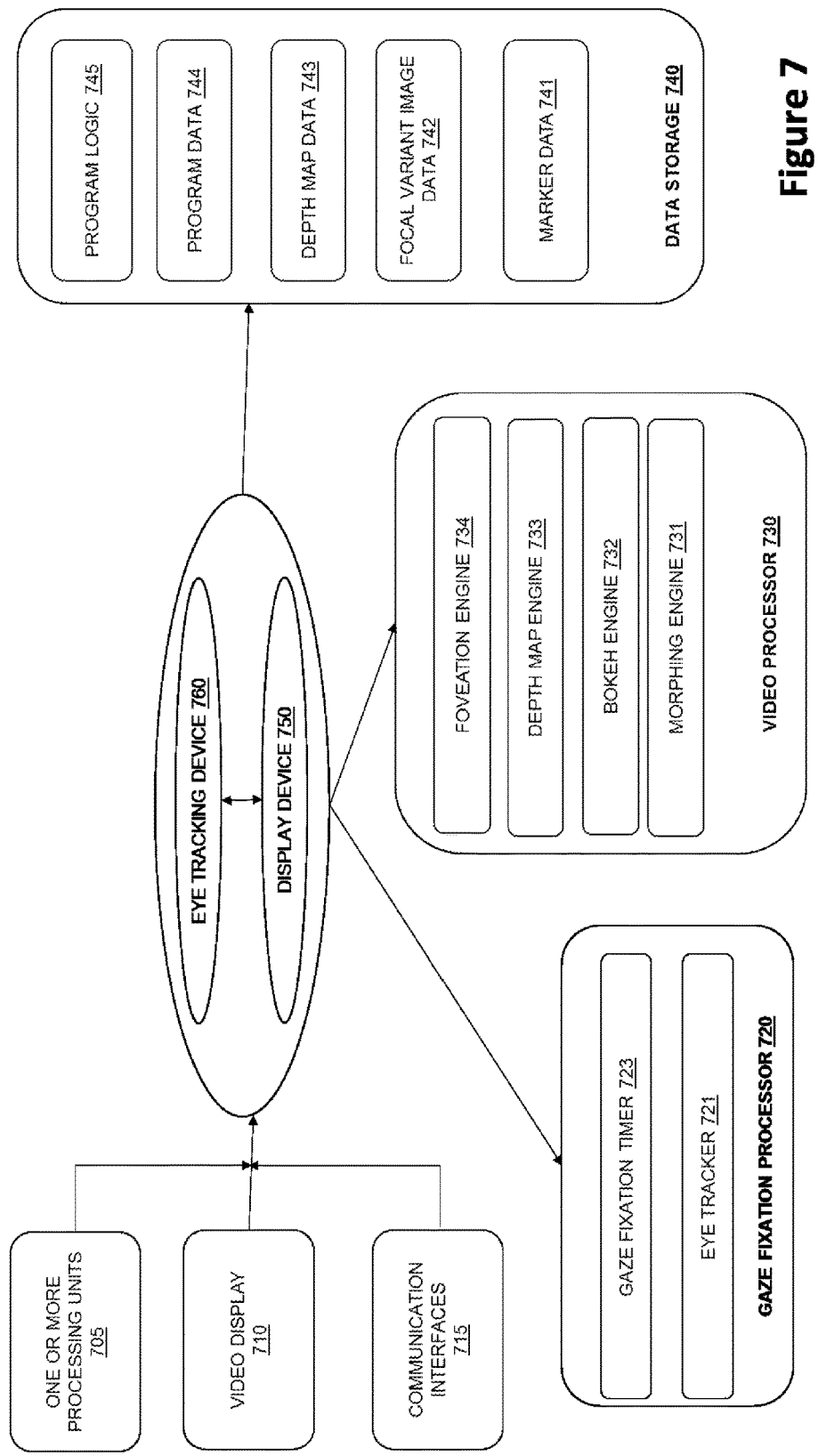
FIG. 7 is a block diagram relating to an example embodiment depicting the system components of that embodiment.

FIG. 7 depicts a block diagram of the system architecture of a preferred embodiment of the invention. The system consists of two major components, namely an eye-tracking device 760 and a display device 750. These components are closely linked together either by being housed in the same casing, or by being interconnected by a fast data connection such as a Bluetooth connection. For the purpose of the other system components it makes sense to treat the eye tracking device and the display device as one single logical unit since it is not of major importance to which device the other logical components are physically grouped. The system has one or more processing units 705, a video display 710 and a plurality of communication interfaces 715. The system comprises a gaze fixation processor 720 which in turn comprises an eye tracker 721 and a gaze fixation timer 723. The eye tracker 721 is a device which is capable of determining the point of gaze fixation on a display screen. Several prior art implementations for this technology exist, such as infrared cameras or electrooculography electrodes. The gaze fixation timer 723 comprises a timing circuit which measures the cumulative time the viewer's gaze fixation rests on an image segment during a defined interval. The video processing unit 730 comprises a foveation engine 734, a depth map engine 733, a bokeh engine 732 and a morphing engine 731. The foveation engine ensures that the point of gaze fixation is always being served with the maximum available level of detail in terms of screen resolution. This is especially important in a virtual reality setting, where the display consists of a spherical projection which makes it undesirable to render the entire image area in full resolution, even if parts of the image are outside of the viewer's vision. The function of the depth map engine 733 is to interpret the inputs of both the gaze fixation timer 723 and the eye tracker 721 and to subsequently translate these inputs into commands for a gaze-contingent refocusing operation. It is the depth map engine which selects an appropriate image from focal variant stack of images and sequences them into the image feed for the video display 710. The bokeh engine 732 is an optional component, primarily suited for displaying animations in a gaming environment. In order to enhance depth perception by the viewer it is essential that not all areas of the displayed image are in sharp focus. When displaying a movie-type plenoptic video sequence setting the right amount of bokeh or blur lies generally within the artistic remit of the producer of video content. However, in the case of plenoptic video content in a gaming environment it may be necessary to postprocess the images in order to add a depth-enhancing bokeh effect. The morphing engine 731 serves the purpose of smoothing out gaze contingent transitions between images in the stack of focal variant images. The data storage component 740 comprises the program logic 745, the program data 744, the depth map data 743, the focal variant image data 742, and marker data 741. The depth map data 743 contains the depth maps for each individual frame, thus storing a depth value for each segment in an image grid. The focal variant image data 742 contains the stacks of images of different focal distances associated with each plenoptic image frame. It has to be emphasized, however, that stacks of focal variant images are not strictly required for the present invention and that the focal variant images stacks are merely utilized in a preferred embodiment for efficiency considerations. It would also be possible to implement an embodiment of the present invention comprising real-time processing of raw plenoptic image field data and thus achieve the desired enhanced depth perception effect without utilizing a stack of focal variant images. The data storage unit 740 further comprises a repository of marker data 741. The marker data is used for attaching special processing instructions to individual frames in a plenoptic video-type sequence of images. In particular the present inventor considers it advantageous that each change of scene should be accompanied by a corresponding change-of-scene marker. Moreover, the change-of-scene markers ought to contain target depth plane settings, so that each new scene is initialized at a reasonable depth plane in consideration of the focal distance of the primary subject of the scene.

Figure 8:
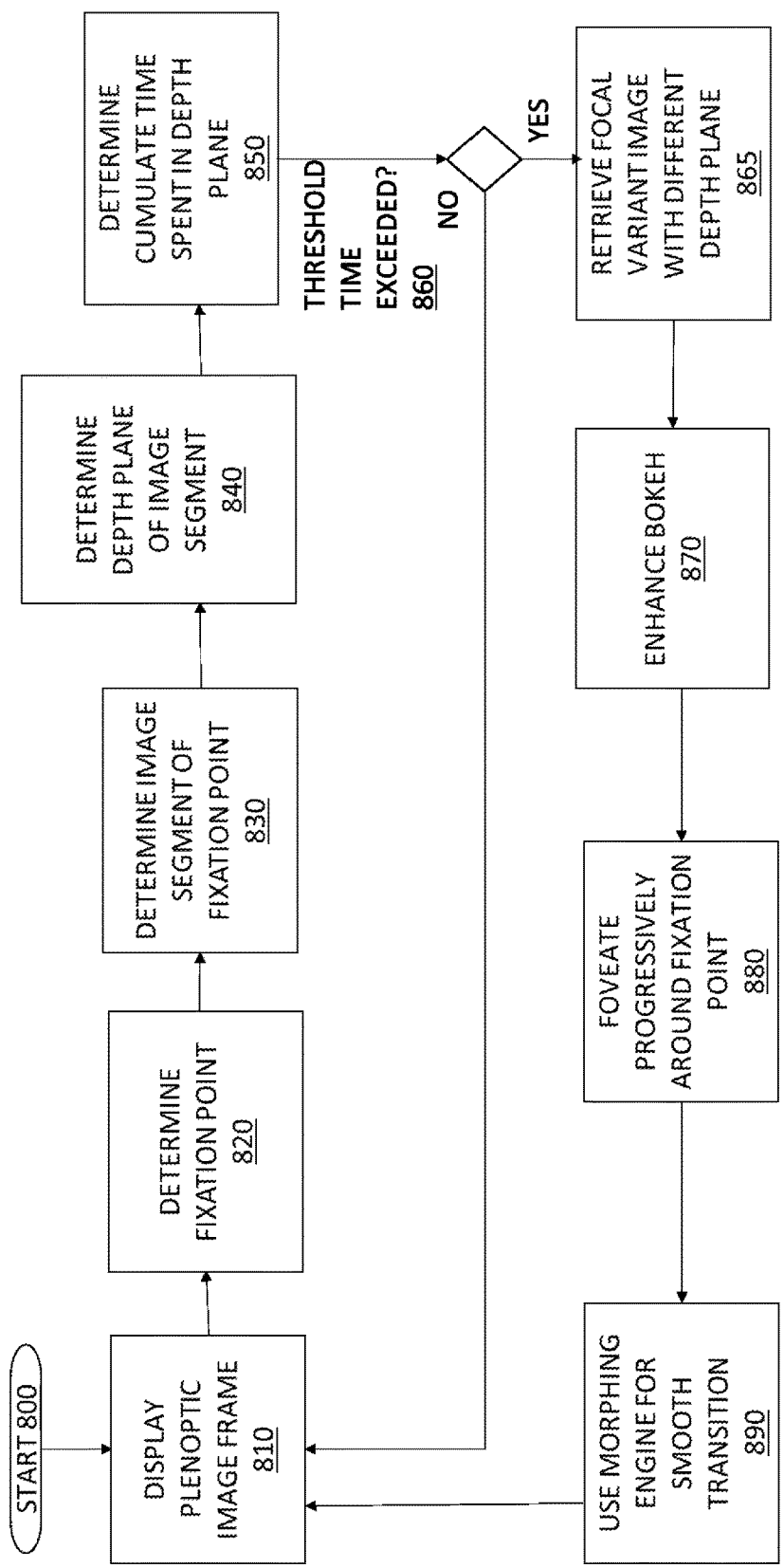
FIG. 8 is a flow diagram depicting the operations and the control flow relating to gaze-contingent refocusing of a plenoptic image in an example embodiment.

FIG. 8 shows a flow chart illustrating an image refocusing operation in an embodiment of the present invention centered around the display of a video-type sequence of plenoptic image frames. At the start 800 of the sequence a plenoptic image frame is displayed 810 at an initial depth plane setting. The next step 820 comprises a determination of the point of gaze fixation, leading to the subsequent step of a determination of the image segment of the point of gaze fixation 830. A determination of the depth plane mapped to the image segment constitutes the next step 840. Then as the following step 850 the cumulative time is determined relating to the overall time the viewer's gaze has been fixed on the segment during a defined interval. A decision fork 860 subsequently divides the flow depending on whether the depth plane specific gaze fixation threshold has been exceeded. If the threshold has not been exceeded, the flow reverts to the image display step 810. If, on the other hand, the threshold has been exceeded, then a focal variant image of a different depth plane is retrieved from the stack of focal variant images 865. Following on, the optional step of bokeh enhancement 870 is performed. Next 880 the foveation engine post processes the image to ensure that maximum resolution is placed at the point of gaze fixation, whereby the resolution may then progressively drop off as a function of the distance from the point of gaze fixation. The final post processing step 890 comprises the use of the morphing engine in such a way that the new image is morphed onto the display from the preceding image in such a way that no abrupt change is noticeable by the user. It has to be noted that the use of a morphing engine is optional if there were a sufficiently large number of focal variants in the stack of focal variants. Therefore if there is a very large stack, then the transitions between adjoining stacks images may be so subtle already that this eliminates the need for a morphing engine. Alternatively in the embodiment where plenoptic images are rendered directly from the raw image field data, a morphing engine would also become obsolete since the image is computationally rendered in real time. Rendering in real time would encompass a build-in smoothing function and thus no separate morphing engine would be required. The preferred embodiment, however, makes a conscious choice for focal variant stacks since the present inventor considers that the computational requirements for real time processing of image field data coupled with the requirements of gaze contingent refocusing would put too great demands on processor specifications. Once sufficiently performant and affordable processors become available in the future, however, it is envisaged, that eventually a move away from focal variant stacks to real time processing of image field data should occur.

Figure 9:
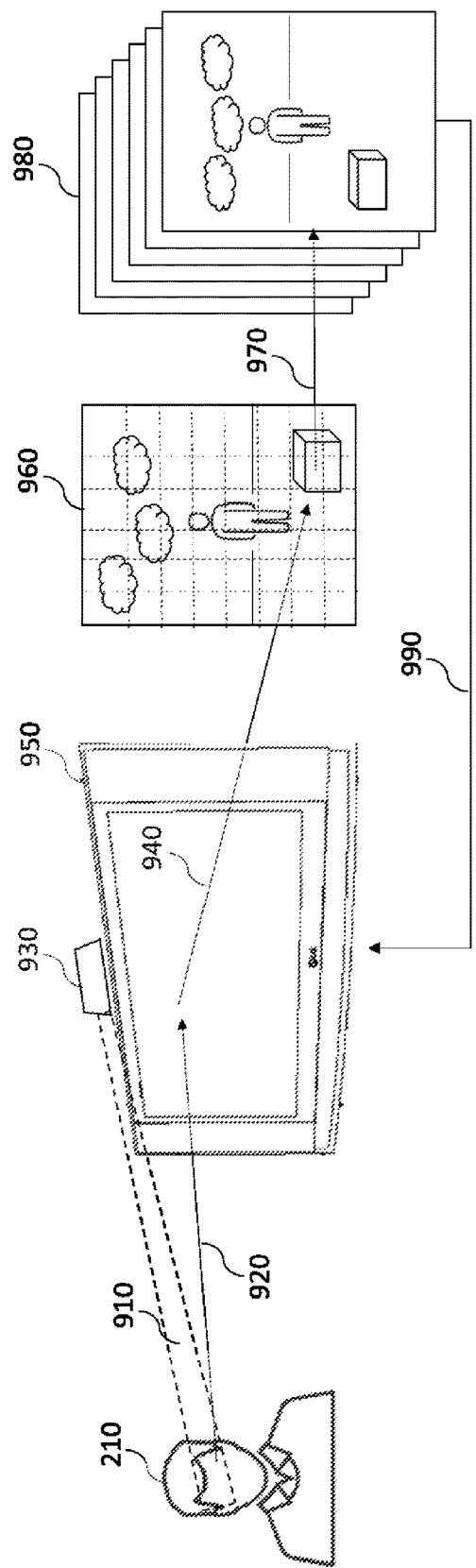
FIG. 9 is a schematic diagram relating to a simple embodiment of the present invention comprising displaying a plenoptic image on a television-type device and providing gaze-contingent refocusing capability.

FIG. 9 depicts a simple embodiment of the present invention whereby a viewer 210 uses a television-type display device 950 with an associated set-top infrared eye movement tracking device 930. The said eye tracker 930 illuminates 910 the viewer's 210 eye area and deduces the user's gaze fixation 920 by visual observation of the eye movements. The gaze fixation is then transposed 940 onto a depth map 960, which is in turn mapped to a stack of focal variant images 980. Once a different depth plane is selected 990 a new focal variant 970 is displayed on the screen.

Figure 10:
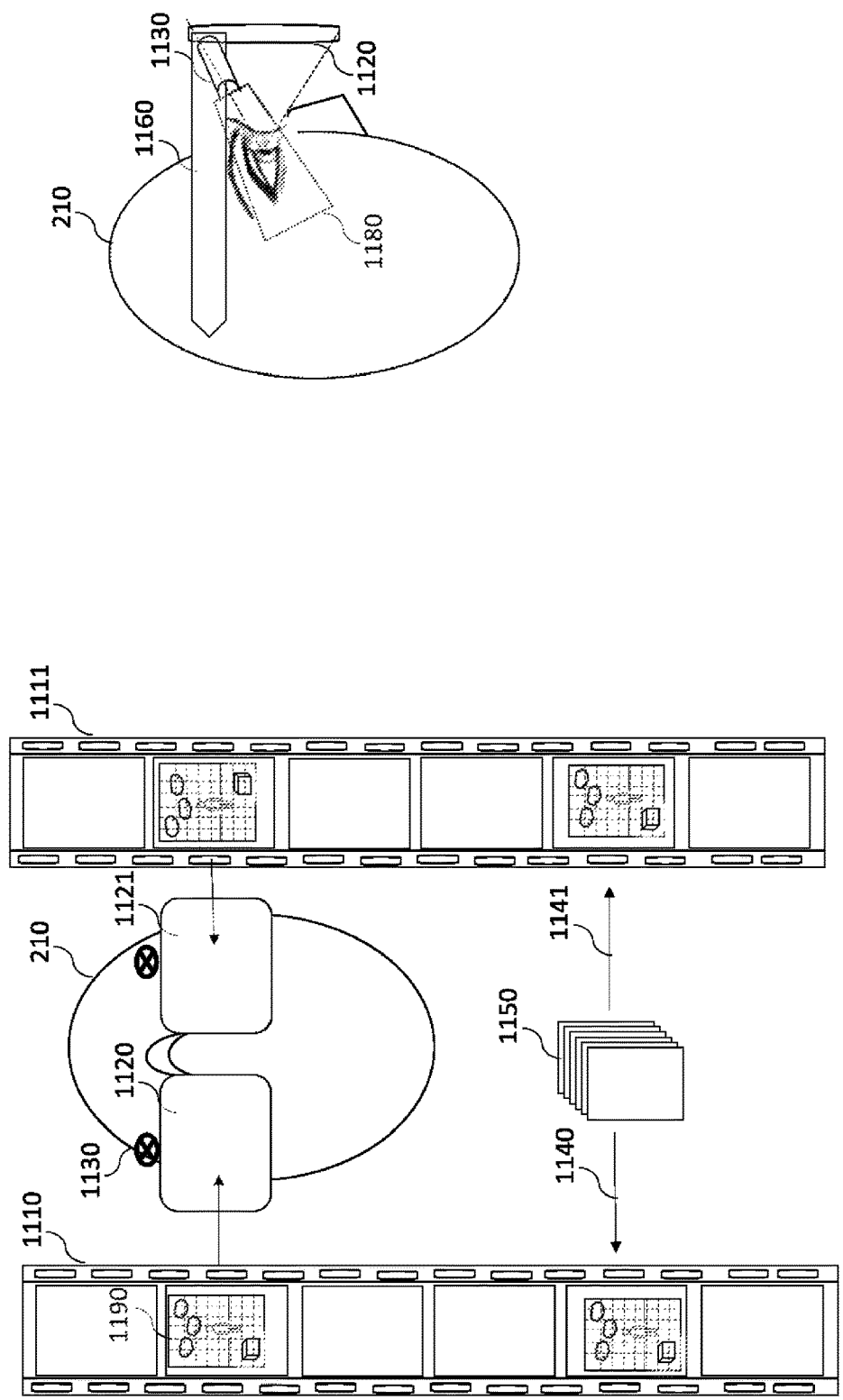
FIG. 10 is a schematic diagram relating to a complex embodiment of the present invention comprising displaying a video-sequence of plenoptic images on a virtual reality head-mountable device and providing gaze-contingent refocusing capability.

FIG. 10 illustrates an embodiment of the present invention featuring more advanced technological requirements. The user 210 is wearing a head-mountable device 1160 which comprises a display 1120 for the right eye and a display 1121 for the left eye. Essentially the setting is a virtual reality (VR) setup similar to commonly available VR googles in the consumer market, such as the Oculus Rift. The head-mountable device comprises an infrared camera type eye tracking device 1130. In alternative embodiments contact electrode based electrooculographic detection of eye movements may be used instead. The presently described embodiment is used to view a movie-type sequence of plenoptic images 1190. The images are sequenced in the form of individual frames for both the right eye 1110 and the left eye 1111. In contrast to the previous embodiment of FIG. 9, this embodiment does not make use of focal variant image stacks and uses the processor-intense alternative of direct processing of the image field data in real time. Each plenoptic image 1190 comprises a depth map which produces an association to an array of virtual depth planes 1150. It should be noted that the depth planes are always identical with respect to the left-eye display 1141 in comparison to the right eye display 1140.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The gaze initiated interaction technique may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for enabling a user of a display screen device to experience an enhanced spatial perception of plenoptic content, the method comprising:
   a tracking step for tracking a gaze fixation of a user; and
   a timing step for timing over a set interval an accumulated time in which the user's gaze fixation rests on each of a plurality of at least two depth planes which have been associated with a plurality of at least one plenoptic image; and
   a refocusing step for refocusing a display relating to the plurality of at least one plenoptic image.

2. The method of claim 1, wherein the refocusing step is executed once a threshold relating to the accumulated time has been exceeded.

3. The method of claim 1, wherein the refocusing step comprises retrieving a TIF-format image associated with a target focal distance depth plane from a focal variant stack of TIF-format images, and wherein said focal variant stack of TIF-format images is a format for viewing said plenoptic image.

4. The method of claim 3, wherein the focal variant stacks of TIF-format images is expressed in a data format which allows the number of images per stack to be variable.

5. The method of claim 1, wherein the refocusing step comprises applying progressive foveated imaging to the point of gaze fixation wherein the display resolution is greatest at the point of gaze fixation and wherein the display resolution becomes progressively smaller as a function of distance to the point of gaze fixation.

6. The method of claim 1, wherein the timing step comprises detecting a change of scene in the plurality of at least one plenoptic image and wherein the timing step is reset to initial conditions once the change of scene is detected.

7. The method of claim 6, wherein the detecting step comprises reading a change-of-scene marker embedded in a video-type sequence of plenoptic images.

8. The method of claim 1, wherein the refocusing step comprises detecting a change of scene and causing the focal depth to be reset to an initial value.

9. The method of claim 8, wherein the detecting step comprises reading the initial value from a marker embedded in the video-type sequence of plenoptic images.

10. The method of claim 1, further comprising a step of reading in a scene-associated depth map wherein said plurality of at least two depth planes is associated with a first scene in relation to a video-type sequence of plenoptic images and wherein a second scene is associated with a second plurality of at least two depth planes.

11. The method of claim 10 further comprising a step of obtaining an initial target depth value associated with the scene-associated depth map.

12. The method of claim 1 further comprising a blurring step for artificially increasing bokeh and wherein the blurring step is executed once a threshold relating to the accumulated time has been.

13. The method of claim 1 wherein the plurality of at least one plenoptic image is associated with a virtual projection in a virtual or augmented reality environment and wherein only a part of a plenoptic image of said plurality of at least one plenoptic image is displayed to the user at any given time.

14. A nontransitory computer-readable medium on which are stored program instructions that, when executed by a processor, cause the processor to perform the operations of
   timing an accumulated duration of a user's gaze fixation during a set amount of time on a plurality of segments associated with a plenoptic image, and
   refraining from adjusting focus of said plenoptic image until a threshold-exceeded event relating to said operation of timing has been detected.

15. The nontransitory computer-readable medium of claim 14 further comprising a blurring operation for increasing bokeh, wherein said blurring operation is configured to be executed in response to said threshold-exceeded event.

16. The nontransitory computer-readable medium of claim 14 further comprising an operation of reading in data relating to a change of scene marker and wherein the operation of timing is configured to start in response to reading the change of scene marker.

* * * * *